June 29, 1954 R. R. GREENWOOD 2,682,215
ROTARY-TYPE FENDER FOR CULTIVATORS
Filed Aug. 20, 1952 2 Sheets-Sheet 1

INVENTOR.
Raymond R. Greenwood
BY
ATTORNEY

June 29, 1954  R. R. GREENWOOD  2,682,215
ROTARY-TYPE FENDER FOR CULTIVATORS
Filed Aug. 20, 1952  2 Sheets-Sheet 2
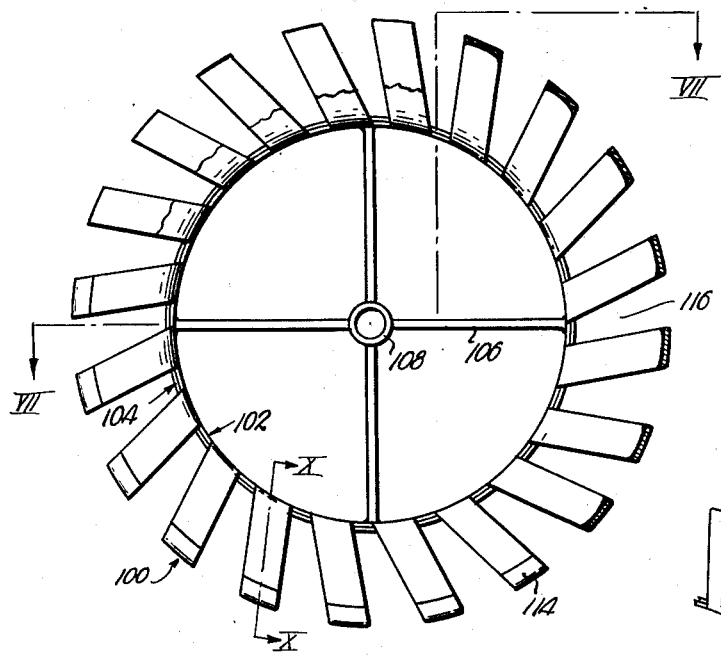
Fig. 6.
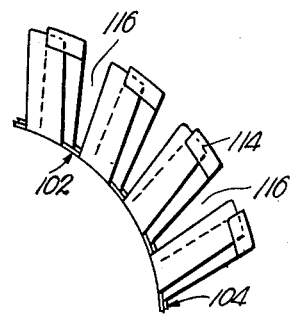
Fig. 8.
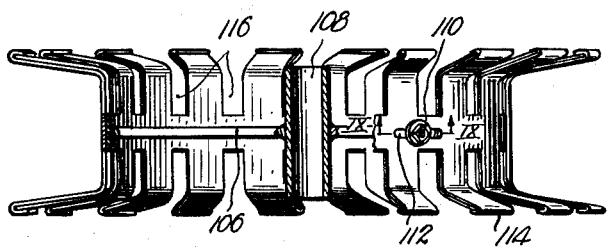
Fig. 7.
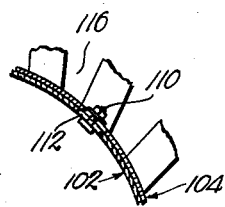
Fig. 9.
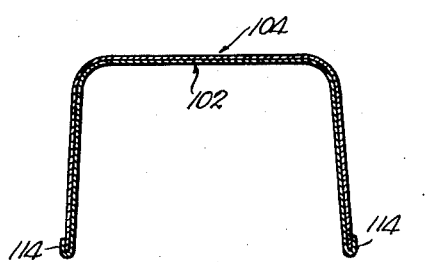
Fig. 10.
INVENTOR.
Raymond R. Greenwood
BY
ATTORNEY.

Patented June 29, 1954

2,682,215

UNITED STATES PATENT OFFICE 2,682,215

ROTARY-TYPE FENDER FOR CULTIVATORS

Raymond R. Greenwood, Blythedale, Mo.

Application August 20, 1952, Serial No. 305,375

5 Claims. (Cl. 97—188)

This invention relates to the art of husbandry, and more particularly to an attachment for an agricultural implement of the kind that is provided with means of tillage, the attachment being in the nature of a cultivator fender so designed as to perform not only the function of protecting the plant from bruising, deflecting clods that would otherwise cover and fall on to the plant, but capable of scattering fine dust around the plant automatically as cultivation takes place.

The present invention is distinguishable over that disclosed in my co-pending application, Serial No. 305,376, filed on even date herewith and entitled "Wall-Type Fender for Cultivators and Means for Mounting the Same," in that a double-wall fender in said co-pending application normally travels along a horizontal path but is mounted for swinging movement in accordance with the unevenness of the terrain.

It is an important object of the present invention, like in my co-pending application, to provide a fender for cultivators and the like that is mounted upon a traction frame such as a tractor, rather than upon the cultivator itself, all to the end that the movement of the fender is unaffected by movement of the cultivator shares or shovels.

It is the most important object of this invention to provide a rotatable-type fender that includes a wheel-like member having a plurality of openings throughout its circumference for passing dust and fine particles of dirt to the plant, which dust particles are automatically picked up by the fender as it rotates.

Another important object of the present invention is to provide structure on the wheel-like fender for varying the size of the aforesaid openings.

Other objects include the way in which the fender is floatingly mounted for free upward movement as it rolls along uneven terrain; the manner of providing an adjustable stop to limit the extent of downward movement of the rotatable fender; the way in which the fender may be adjusted with respect to its position relative to the cultivator shovels; the manner of providing a fender cleaner on the supporting frame for the rotary fender; and many other more minor objects, all of which will be made clear or become apparent as the following specification progresses, reference being had to the accompanying drawing, wherein:

Fig. 6 is a side elevational view of a rotary-type fender for cultivators made pursuant to a modified form of the invention hereof entirely removed from its supporting frame, parts being broken away and in section for clearness.

Fig. 7 is a cross-sectional view taken on irregular line VII—VII of Fig. 6.

Fig. 8 is a fragmentary, side elevational view illustrating the manner of adjustment of the structure for determining the size of the openings.

Fig. 9 is a fragmentary, detailed, transverse, cross-sectional view taken on line IX—IX of Fig. 7; and Fig. 10 is an enlarged, transverse, cross-sectional view taken on line X—X of Fig. 6.

While the rotary-type fender forming the subject matter hereof is adapted for attachment universally to many types of implements for tending growing crops, there has been chosen for illustration, a tractor 10 having a cultivator removably attached thereto in the customary manner that includes a plurality of shares or skim shovels 12, similar to a scarifier, and it is obvious that the particular type of tillage means with which the fender hereof is used, is not material to this invention. It is important however, to note that the fender is attached directly to the tractor 10, rather than to the cultivator on the tractor 10 as is the normal practice. For the most part, therefore, the various movements of the fender hereof are not directly responsive to the movement of shovels 12.

Figure 1:
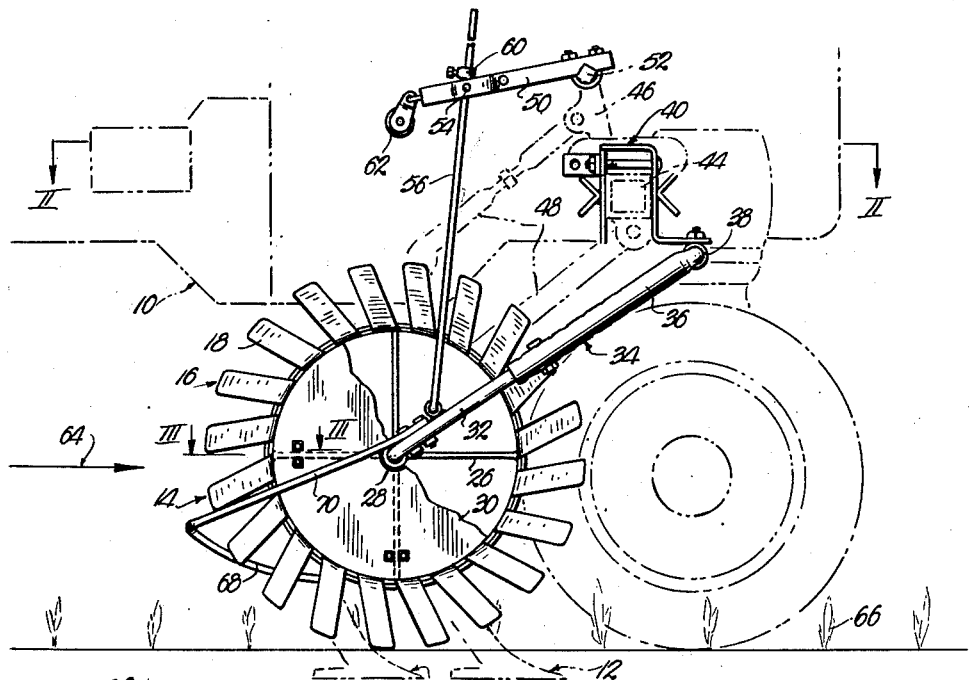
Figure 1 is a side elevational view of a rotary-type fender for cultivators made pursuant to the present invention illustrating fragmentarily, a tractor and a cultivator in phantom and the novel means for mounting the fender which forms the subject matter of this invention upon said tractor, parts being broken away for clearness.
Figure 2:
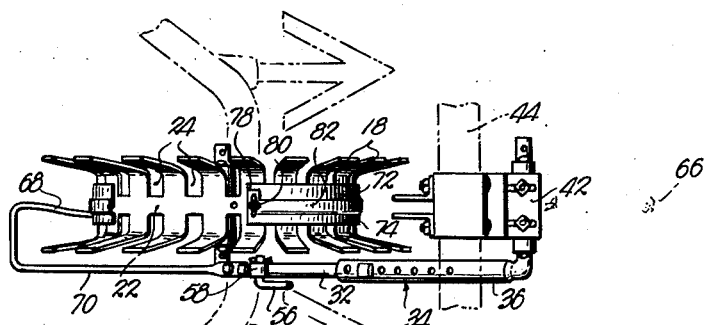
Fig. 2 is a transverse, cross-sectional view taken on line II—II of Fig. 1, illustrating the cultivator attachment fragmentarily, but omitting the tractor that is illustrated in Fig. 1.

In the form of my present invention illustrated in Figs. 1 to 5, inclusive, there is provided a rotary-type fender broadly designated by the numeral 14. The fender 14, which is illustrated in Figs. 1 and 2 of the drawings as taking the form of a wheel, is preferably made from an initially flat, elongated strip of sheet metal having a plurality of members 16 stamped therefrom and bent substantially into the shape of a U, as shown most clearly in Fig. 3, each member 16, therefore, having a pair of spaced-apart legs 18 that diverge as the outermost free ends thereof are approached and a bight 20 that extends transversely of the wheel-like fender 14. Actually, the bights 20 are integral with a circumferential rim 22, having its ends interconnected by welding or in any other suitable manner not shown. There is presented, therefore, a plurality of openings 24 throughout the periphery or circumference of the fender 14.

The rim 22 is joined directly to a plurality of spokes 26 at the outermost ends of the latter, which spokes 26 radiate from a hub 28 and, if desired, a circular plate 30 may be secured to the spokes 26 in the manner shown in Fig. 1. Hub 28 is rotatably mounted on an L-shaped section 32 of an extensible member 34, section 32 being telescoped within a tubular section 36 and rendered adjustable relative thereto as indicated in Figs. 1 and 2. The section 36 is also L-shaped and extends through a hinge barrel 38 on a clamp, broadly designated by the numeral 40. As shown in Fig. 2 of the drawings, the member 34 is also adjustable transversely with respect to the hub 28, and the hinge barrel 38, and the latter is adjustably affixed to a lateral extension 42 on the clamp 40. Clamp 40 is universally adapted for attachment to the frame of various types of implements or tractors and in the present instance, it is shown rigidly mounted upon a transverse beam 44, forming a part of the cultivator attachment.

The rotary-type fender hereof is adapted for raising either manually or by the raising and lowering mechanism for the cultivator attachment on tractor 10. Such mechanism includes a member 46 swingable on the horizontal axis of beam 44 coupled with the shank frames for shovels 12 by structure 48.

In accordance with the present invention, there is provided an elongated arm 50 extending laterally from a cross element 52 on member 48 parallel with beam 44 and swingable relative thereto. A pivot member 54 on the arm 50, slidably and swingably receives an L-shaped rod 56 that is pivotally secured to the section 32 of extensible member 34 by a small bearing 58. An adjustable stop 60 on the rod 56 overlies the pin 54.

It is thus seen that as the cultivator is raised and lowered through the lifting mechanism to swing the member 46 and the element 52, arm 50 is likewise swung to lift the fender 14 through rod 56 and the extensible structure 34. In the event that manual control of the rotary fender 14 is desired, the rod 56 may be eliminated and a cable attached to the section 32 passed over a pulley 62 on the arm 50 and extended to the position of the operator of tractor 10.

It is noted in Fig. 1 of the drawings, that the legs 18—18 of members 16, are angularly disposed, i. e., their longitudinal axes are not on the radii of the fender 14, but are tangentially arranged with respect to the periphery of fender 14 with their outermost free ends trailing when the fender 14 rotates as it rides along the ground upon movement of the tractor 10 in the direction of arrow 64 in Fig. 1. Thus, the continuous channel around the fender 14 presented by the members 16, receives the growing plants 66 and protects the same from bruising and from clods that are naturally turned up by shovels 12. At the same time, the legs 18 tends to pick up dust and fine particles of dirt and carry the same therewith, which dust passes through the openings 24 to the plants 66. During the rotation of fender 14, a cleaner 68 removes old stalks, roots, grass, weeds and other trash from fender 14. Cleaner 68 is mounted directly on the section 32 of member 34 by means of a rod 70 forming a part thereof.

Figure 4:
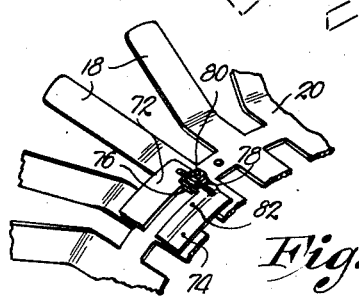
Fig. 4 is an enlarged, fragmentary, top perspective view illustrating the manner of adjustment of the annuli that surround the rotary fender.
Figure 5:
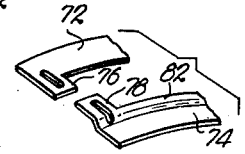
Fig. 5 is an enlarged, fragmentary, detailed, stretched-out, perspective view showing details of construction of the aforesaid annuli.

The amount of fine dirt that is thus fed to the plants 66 may be regulated in accordance with the present invention since the condition of the earth and the size of plants 66 will require such rather accurate adjustment. To this end there is provided, therefore, a pair of annuli 72 and 74 that surround the fender 14 within the circumferential channel thereof, and which annuli 72 and 74 engage the rim 22, as well as a portion of the bights 20. Annuli 72 and 74 are in the nature of elongated split bands and are interconnected by a plurality of opposed ears 76 and 78 respectively, that are relatively overlapped as shown in Fig. 4, and interconnected by bolt and nut means 80 that pass through openings in the rim 22 and/or bights 20, as the case may be.

Figure 3:
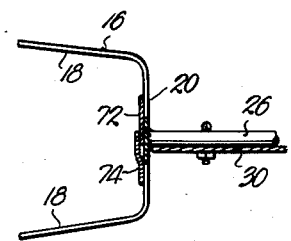
Fig. 3 is an enlarged, fragmentary, detailed, cross-sectional view taken on line III—III of Fig. 1.

The innermost longitudinal edge of the annulus 74 is offset as at 82 to overlap the proximal innermost marginal edge of the annulus 72 when the annuli 72 and 74 are moved together to the innermost ends of their paths of travel. It is seen, therefore, that the size of openings 24 may be varied by shifting the annuli 72 and 74 relatively toward and away from each other. In Figs. 1, 2 and 3 such adjusting means 72—74 is shown with openings 24 at their maximum capacity when the band-like members 72 and 74 are used. In Fig. 4 of the drawings, the openings 24 are slightly reduced in size by spacing the elements 72 and 74 apart.

The modification of my invention shown in Figs. 6 to 10, inclusive, is essentially the same as above described except only for the manner of adjusting the size of the openings. To this end, therefore, there is provided in the wheel-like fender 100, a pair of substantially identical wheel assemblies 102 and 104 telescoped one within the other with the assembly 104 surrounding the assembly 102 as is perhaps most clearly illustrated in Fig. 10.

It is seen that each assembly 102 and 104 is made up of a plurality of substantially U-shaped elements interconnected integrally by an annular rim, the legs of the U-shaped elements being disposed at a tangent as shown in Figs. 6, 8 and 9 in the same manner as above described with respect to the rotary fender 14. The innermost assembly 102 is secured to radial spokes 106 on a tubular hub 108 and the outermost assembly 104 is shiftable along a circular path relative to the assembly 102. Such relative shifting of the two wheels 102 and 104 is presented by tightening bolt and nut means 110 that pass through aligned slots 112.

Added rigidity is accomplished in the form of my invention shown in Figs. 6 to 10, inclusive, by providing out-turned loops 114 on the outermost free end of each leg respectively of the innermost assembly 104 which are slidably hooked over the proximal ends of the legs of the outermost assembly 102. It is thus seen in Fig. 8 of the drawings, that when the assemblies 102 and 104 are relatively shifted, the loops 114 slide relative to the legs of the outermost assembly 102.

Openings 116 throughout the periphery of the fender 100, are varied in size, therefore, by merely shifting the two substantially identical, relatively telescoped assemblies 102 and 104.

It is manifest that the fender 100 may be mounted for rotation on a horizontal axis in the same manner as fender 14 is mounted and that the same will rotate along the terrain by engagement therewith through proper adjustment of the stop 60 on the mounting structure.

Having thus, described the invention what is claimed as new and desired to be secured by Letters Patent is:

1. In an implement for tending growing crops, an attachment for deflecting plants to prevent bruising, to keep clods from rolling on to said plants, and for sifting fine dirt around the plants, said attachment comprising a wheel-like fender having structure forming a circumferential, outwardly-facing channel, said structure being provided with a plurality of openings; means secured to said structure within the channel and shiftable with respect thereto for varying the size of said openings; and means for mounting said fender on the implement for rotation on a substantially horizontal axis.

2. In an implement for tending growing crops, an attachment for deflecting plants to prevent bruising, to keep clods from rolling on to said plants, and for sifting fine dirt around the plants, said attachment comprising a wheel-like fender having a circular rim, a plurality of substantially U-shaped members, each having a bight and a pair of spaced, elongated legs, the bights being integral with the rim and disposed to present a circumferential, outwardly-facing channel, said members being spaced apart, presenting a plurality of openings; means secured to the fender in overlying engagement with said rim and said bights within the channel, and shiftable with respect thereto for varying the size of said openings; and means for mounting said fender on the implement for rotation on a substantially horizontal axis.

3. In an implement for tending growing crops, an attachment for deflecting plants to prevent bruising, to keep clods from rolling on to said plants, and for sifting fine dirt around the plants, said attachment comprising a wheel-like fender having structure forming a circumferential, outwardly-facing channel, said structure being provided with a plurality of openings; a pair of annuli secured to said structure within the channel and shiftable with respect thereto for varying the size of said openings, said annuli being movable toward and away from each other; and means for mounting said fender on the implement for rotation on a substantially horizontal axis.

4. In an implement for tending growing crops, an attachment for deflecting plants to prevent bruising, to keep clods from rolling on to said plants, and for sifting fine dirt around the plants, said attachment comprising a pair of wheel-like elements each having structure forming a circumferential, outwardly-facing channel provided with a plurality of openings, one element surrounding the other element and being seated therein; means shiftably interconnecting the elements for varying the size of said openings; and means for rotatably mounting the elements on the implement.

5. In the attachment as set forth in claim 4, wherein said channels formed by the structures of the elements each include a pair of opposed, spaced-apart sides, the sides of the channel of one element being provided at their outermost extremities with ground-engaging loops extending about the outermost extremities of the corresponding sides of the channel of the other element and thence substantially radially of the attachment for a distance toward the center of the latter, whereby to prevent the entry of material between corresponding sides of the channels at their outermost extremities.

References Cited in the file of this patent

UNITED STATES PATENTS

| Number | Name | Date |
|---|---|---|
| 1,880,584 | Tibbitts | Oct. 4, 1932 |
| 2,616,348 | Ariens | Nov. 4, 1952 |
| 2,624,259 | Greiman | Jan. 6, 1953 |
| 2,624,261 | Greiman | Jan. 6, 1953 |